(12) United States Patent
Chen

(10) Patent No.: US 6,260,681 B1
(45) Date of Patent: Jul. 17, 2001

(54) FREE-WHEEL HUB TRANSMISSION MECHANISM

(75) Inventor: Hubert Chen, Taichung Hsien (TW)

(73) Assignee: Kun Teng Industry Co., Ltd., Taichung Hsien (TW)

( * ) Notice: Subject to any disclaimer, the term of this patent is extended or adjusted under 35 U.S.C. 154(b) by 0 days.

(21) Appl. No.: 09/527,375

(22) Filed: Mar. 16, 2000

(51) Int. Cl.$^7$ .............................. F16D 41/24; B60B 27/02
(52) U.S. Cl. .................. 192/64; 192/110 B; 301/110.5; 384/520; 384/545
(58) Field of Search ................. 192/64, 110 B; 301/110.5; 384/545, 520, 510

(56) References Cited

U.S. PATENT DOCUMENTS

| | | | |
|---|---|---|---|
| 4,567,973 | * | 2/1986 | Butz ........................................ 192/64 |
| 5,738,197 | * | 4/1998 | Kroger et al. ........................... 192/64 |

FOREIGN PATENT DOCUMENTS

646836 * 11/1950 (GB) ..................................... 192/64

* cited by examiner

*Primary Examiner*—Richard M. Lorence
(74) *Attorney, Agent, or Firm*—Townsend and Townsend and Crew LLP

(57) ABSTRACT

A hub transmission mechanism includes an axle inserted coaxially into a through-hole in a spoke-mounting barrel such that a right axle portion thereof extends outwardly from the spoke mounting barrel. A sprocket mounting member is sleeved around the right axle portion, and includes an outer shell coupled with a right end of the spoke-mounting barrel, left and right bearing units disposed within the outer shell, a tubular sleeve disposed within the outer shell around the right axle portion and between the bearing units, and a restricting spacer unit disposed within the outer shell and cooperating with the tubular sleeve to restrict radial and axial displacement of the bearing units relative to the outer shell, thereby defining an aligned bore for smooth extension of the right axle portion of the axle during assembly.

4 Claims, 5 Drawing Sheets

FREE-WHEEL HUB TRANSMISSION MECHANISM

BACKGROUND OF THE INVENTION

1. Field of the Invention

The present invention relates to a bicycle transmission mechanism, more particularly to a free-wheel hub transmission mechanism for a bicycle.

2. Description of the Related Art

Referring to FIG. 1, a conventional free-wheel hub transmission mechanism is shown to include an axle 3 and a spoke-mounting barrel 1 mounted rotatably around the axle 3 in such a manner that a right axle portion 300 thereof projects outwardly from a right end portion 100 of the spoke-mounting barrel 1. A sprocket mounting member 5 is sleeved around the right axle portion 300 of the axle 3 adjacent to the right end portion 100 of the spoke-mounting barrel 1. The sprocket-mounting member 5 includes an outer shell 500 that is coupled with the right end portion 100 of the spoke-mounting barrel 1 and that has an inner wall surface 501 formed with a proximate small-diameter wall section 502 and a distal large-diameter wall section 503. Left and right bearing units 6 are disposed inside the large-diameter wall section 503 of the outer shell 500 and around the right axle portion 300 of the axle 30. A positioning tubular sleeve 7 is disposed within the large-diameter wall section 503 of the outer shell 500 around the right axle portion 300 of the axle 3 in such a manner that two opposite ends of the tubular sleeve 7 abut against the left and right bearing units 6, respectively, in order to prevent axial displacement of the left and right bearing units 6 relative to each other. A clutch assembly 4 is disposed inside the right end portion 100 of the spoke-mounting barrel 1 and is operably coupled with the outer shell 500 so as to permit co-rotation of the spoke-mounting barrel 1 with the sprocket mounting member 5 in only a single direction.

Some of the drawbacks of the aforementioned conventional free-wheel hub transmission mechanism are as follows:

It is somewhat difficult to assemble the components of the aforesaid hub transmission mechanism. During assembly, the axle 3 is inserted through the spoke-mounting barrel 1 in such a manner that the right axle portion 300 projects outwardly from the right end portion 100 of the spoke-mounting barrel 1. The sprocket mounting member 5 is then mounted around the right axle portion 300 of the axle 3. Because the tubular sleeve 7 is radially displaceable in the outer shell 500 so that just prior to mounting of the sprocket mounting member 5 around the right axle portion 300, the central bores in the bearing units 6 and the tubular sleeve 7 within the outer shell 500 must be aligned with each other to permit smooth extension of the right axle portion 300 therethrough. As such, a relatively long assembly time is thus incurred.

SUMMARY OF THE INVENTION

Therefore, the object of this invention is to provide a free-wheel hub transmission mechanism which includes an axle and a sprocket mounting member provided with a tubular sleeve and a restricting spacer unit of specific configurations such that only a relatively short amount of time is required for mounting of the sprocket mounting member on the axle.

Accordingly, a free-wheel hub transmission mechanism of the present invention includes an axle with left and right axle portions, a tubular spoke-mounting barrel, a sprocket mounting member, and a clutch assembly. The spoke-mounting barrel has a right end portion, and defines an axially extending through-hole therethrough. The axle extends co-axially through the through-hole in the spoke-mounting barrel in such a manner that the right axle portion thereof projects outwardly from the right end portion of the spoke-mounting barrel. The sprocket mounting member is sleeved around the right axle portion of the axle adjacent to the right end portion of the spoke-mounting barrel, and includes an outer shell, left and right bearing units, a tubular sleeve, and a restricting spacer unit. The outer shell is coupled with the right end portion of the spoke-mounting barrel, and has an inner wall that is formed with a proximate small-diameter wall section relative to the right end portion of the spoke-mounting barrel and a distal large-diameter wall section, thereby defining a shoulder between the small and large-diameter wall sections. The left bearing unit is disposed inside the large-diameter wall section of the outer shell, and has an inner race sleeved around the right axle portion of the axle, and an outer race. The outer race of the left bearing unit has a left end surface that abuts against the shoulder of the outer shell, and an outer circumferential surface that is in tight engagement with the outer shell. The inner race of the left bearing unit has left and right end surfaces. The tubular sleeve is disposed inside the large-diameter wall section of the outer shell and around the right axle portion of the axle. The tubular sleeve has a left sleeve section with an abutment surface abutting against the right end surface of the inner race of the left bearing unit, and a right sleeve section which extends axially from the left sleeve section away from the left bearing unit. The right bearing unit is disposed inside the large-diameter wall section and is spaced apart axially from the left bearing unit. The right bearing unit has an outer race in tight engagement with the outer shell and an inner race that is disposed around the right sleeve section of the tubular sleeve and that has left and right end surfaces. The restricting spacer unit is disposed inside the large-diameter wall section between the left and right bearing units to restrict axial displacement of the left and right bearing units relative to each other, thereby immobilizing the inner races of the left and right bearing units relative to the tubular sleeve. The clutch assembly is disposed inside the right end portion of the spoke-mounting barrel, and is operably coupled with the outer shell so as to permit co-rotation of the spoke-mounting barrel with the sprocket mounting member in only a single direction.

Before the axle is inserted into the sprocket mounting member during assembly of the mechanism, because the tubular sleeve disposed within the outer shell of the sprocket mounting member is restricted from radial displacement relative to the left and right bearing units, extension of the right axle portion of the axle therethrough can be conducted with ease.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTION OF THE PREFERRED EMBODIMENTS

Figure 1:
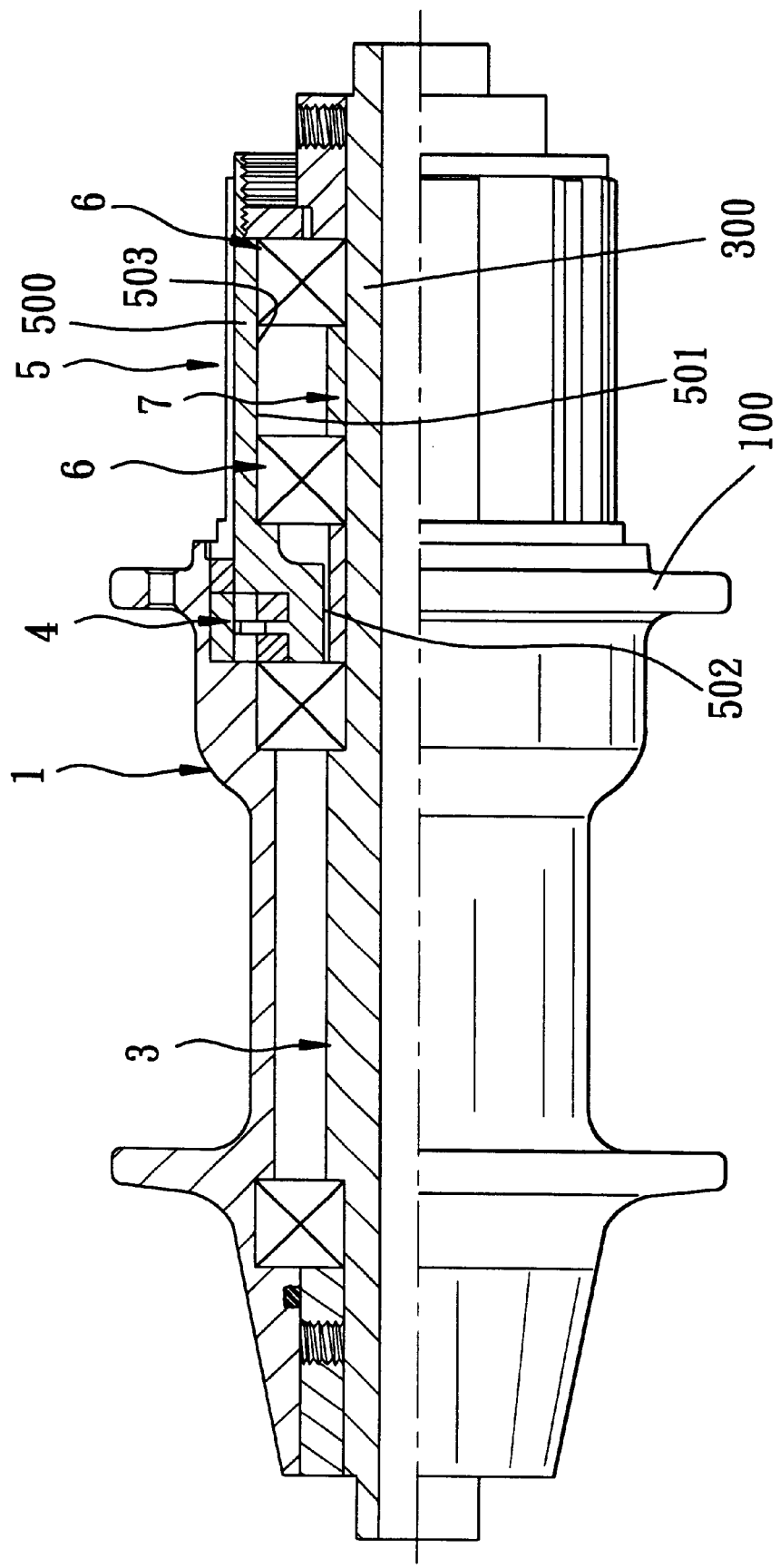
FIG. 1 is a partly sectional view of a conventional free-wheel hub transmission mechanism.
Figure 2:
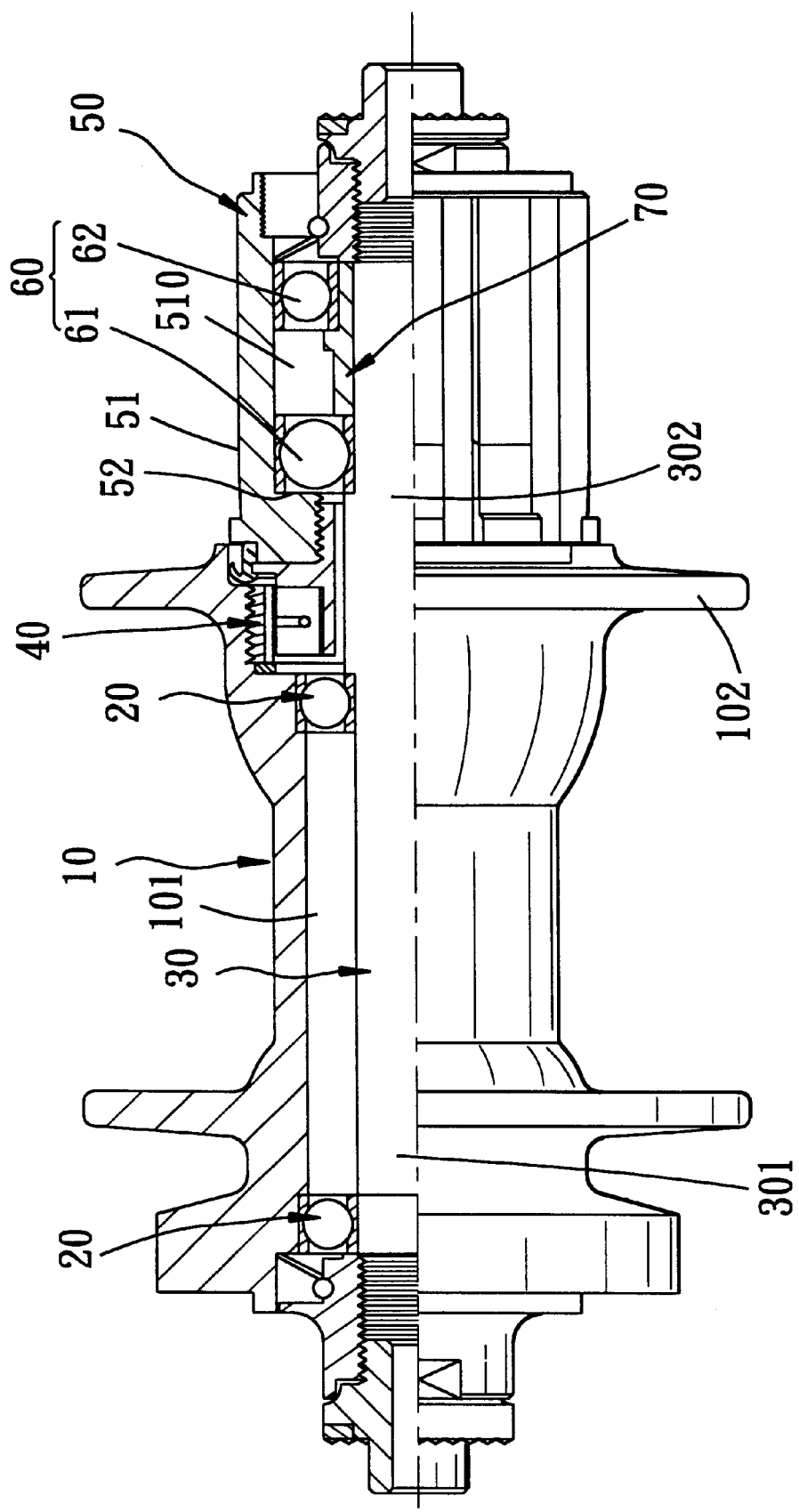
FIG. 2 is a schematic partly sectional view of the first preferred embodiment of a free-wheel hub transmission mechanism of the present invention.
Figure 3:
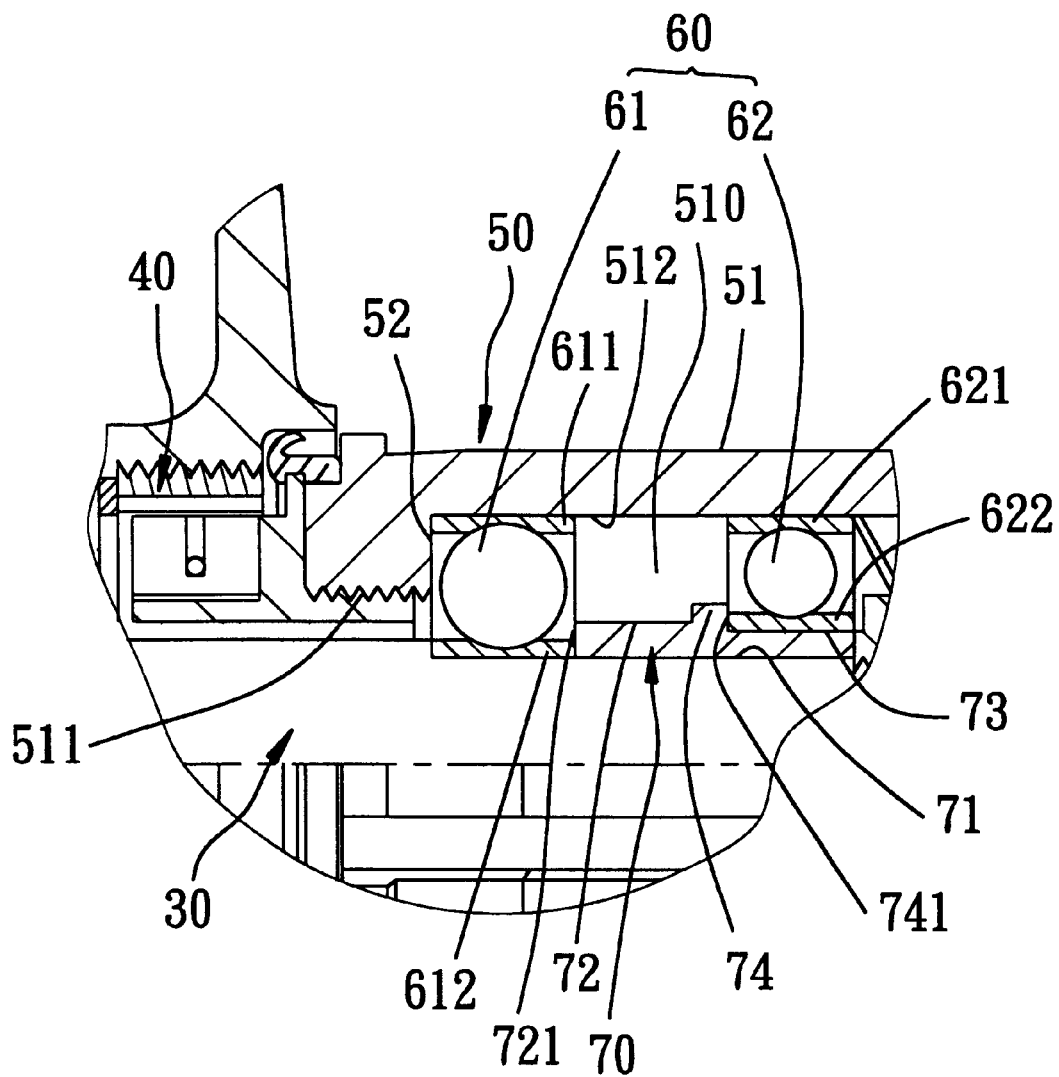
FIG. 3 shows a portion of the first preferred embodiment, illustrating how left and right bearing units are mounted in an outer shell of the first preferred embodiment by the use of a tubular sleeve and a restricting spacer unit.

Referring to FIGS. 2 and 3, the first preferred embodiment of a free-wheel hub transmission mechanism of the present invention is shown to include an axle 30 with left and right axle portions 301,302, a tubular spoke-mounting barrel 10, a sprocket mounting member 50, and a clutch assembly 40.

As illustrated, the spoke-mounting barrel 10 has a right end portion 102, and defines an axially extending through-hole 101 therethrough. The axle 30 extends co-axially through the through-hole 101 of the spoke-mounting barrel 10 in such a manner that the right axle portion 302 thereof projects outwardly from the right end portion 102 of the spoke-mounting barrel 10.

The sprocket mounting member 50 is sleeved around the right axle portion 302 of the axle 30 adjacent to the right end portion 102 of the spoke-mounting barrel 10. The sprocket mounting member 50 includes an outer shell 51, left and right bearing units 61,62, a tubular sleeve 70, and a restricting spacer unit. The outer shell 51 is coupled with the right end portion 102 of the spoke-mounting barrel 10, and has an inner wall 510 that is formed with a proximate small-diameter wall section 511 relative to the right end portion 102 of the spoke-mounting barrel 10 and a distal large-diameter wall section 512, thereby defining a shoulder 52 between the small and large-diameter wall sections 511, 512. The left bearing unit 61 is disposed inside the large-diameter wall section 512, and has an inner race 612 sleeved around the right axle portion 302 of the axle 30, and an outer race 611 which has a left end surface that abuts against the shoulder 52 of the outer shell 51, and an outer circumferential surface that is in tight engagement with the outer shell 51. The inner race 612 of the left bearing unit 61 has left and right end surfaces.

The tubular sleeve 70 is disposed inside the large-diameter wall section 512 of the outer shell 51 and around the right axle portion 302 of the axle 30. The tubular sleeve 70 has a left sleeve section 72 with an abutment surface 721 abutting against the right end surface of the inner race 612 of the left bearing unit 61, and a right sleeve section 73 which extends axially from the left sleeve section 72 away from the left bearing unit 61.

The right bearing unit 62 is disposed inside the large-diameter wall section 512 of the outer shell 51, and is spaced apart axially from the left bearing unit 61. The right bearing unit 62 has an outer race 621 in tight engagement with the outer shell 51, and an inner race 622 that is disposed around the right sleeve section 73 of the tubular sleeve 70 and that has left and right end surfaces.

The restricting spacer unit is disposed inside the large-diameter wall section 512 of the outer shell 51 to restrict axial displacement of the left and right bearing units 61,62 relative to each other, thereby immobilizing the inner races 612,622 of the left and right bearing units 61,62 relative to the tubular sleeve 70.

The clutch assembly 40 is disposed inside the right end portion 102 of the spoke-mounting barrel 10 in a known manner, and is operably coupled with the outer shell 51 so as to permit co-rotation of the spoke-mounting barrel 10 with the sprocket mounting member 50 in only a single direction. Since the structure of the clutch assembly 40 is not pertinent to the present invention, a detailed description thereof will be omitted herein for the sake of brevity.

In the first preferred embodiment, the restricting spacer unit includes a left end surface of the left sleeve section 72 of the tubular sleeve 70, which abuts against the right end surface of the inner race 612 of the left bearing unit 61 and which constitutes the abutment surface 721. An annular flange 74 projects integrally, radially and outwardly from the left sleeve section 72 of the tubular sleeve 70, and has a right end surface for abutment against the left end surface of the inner race 622 of the right bearing unit 62.

Since the tubular sleeve 70 in the outer shell 51 is restricted from radial displacement with respect to the outer shell 51 prior to insertion of the axle 30 into the sprocket mounting member 50, extension of the right axle portion 302 of the axle 30 through the sprocket mounting member 50 can be conducted with ease during the assembly of the mechanism.

Figure 4:
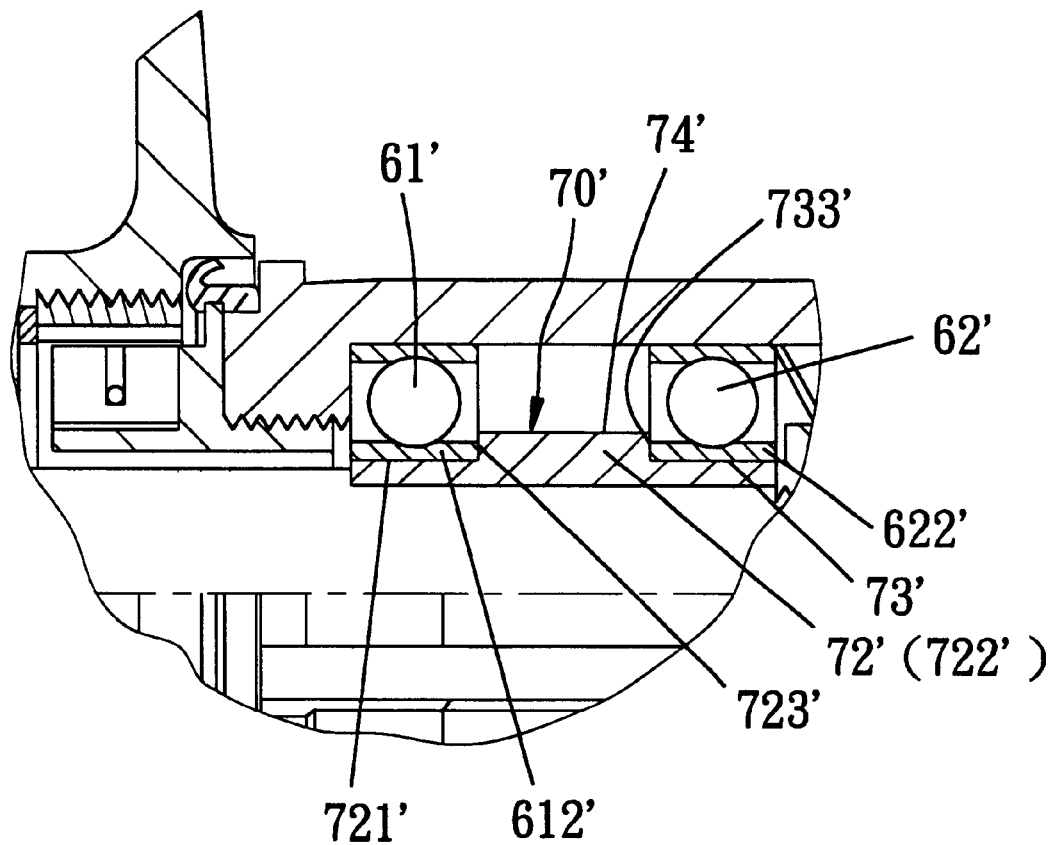
FIG. 4 shows a portion of the second preferred embodiment of the present invention, illustrating how left and right bearing units are mounted in an outer shell the second preferred embodiment by the use of a tubular sleeve and a restricting spacer unit.

FIG. 4 illustrates a second preferred embodiment of the present invention, which has a structure similar to that of the first preferred embodiment, except that the left sleeve section 72' of the tubular sleeve 70' has a small-diameter left portion 721' and a large-diameter right portion 722', which has a diameter larger than that of the small-diameter left portion 721' so as to define a left shoulder 723' therebetween that abuts against the right end surface of the inner race 612' of the left bearing unit 61' and that constitutes the abutment surface. The right sleeve section 73' of the tubular sleeve 70' has a diameter smaller than that of the large-diameter right portion 722', thereby defining a right shoulder 733' therebetween that abuts against the left end surface of the inner race 622' of the right bearing unit 62'. The left and right shoulders 723', 733' constitute the restricting spacer unit of the second preferred embodiment.

Figure 5:
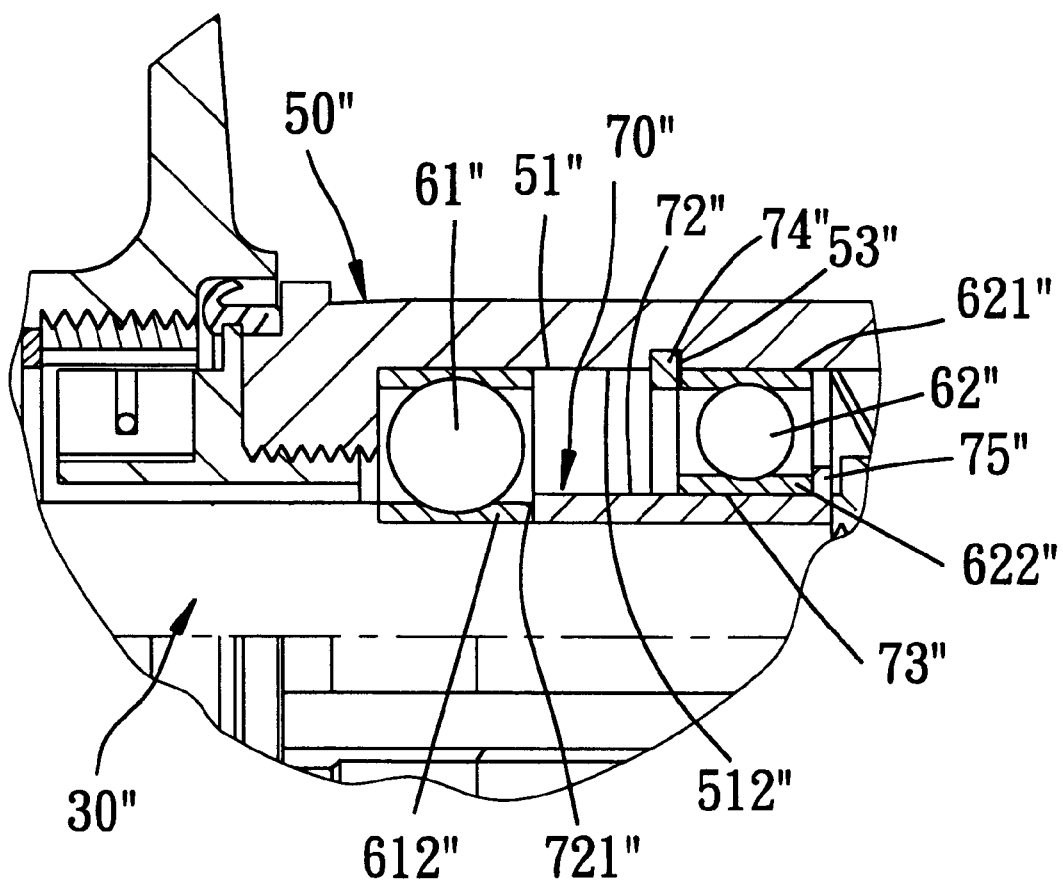
FIG. 5 shows a portion of the third preferred embodiment of the present invention, illustrating how left and right bearing units are mounted in an outer shell of the third preferred embodiment by the use of a tubular sleeve and a restricting spacer unit.

FIG. 5 illustrates a third preferred embodiment of the present invention which has a structure similar to that of the first preferred embodiment, except for the restricting spacer unit. The restricting spacer unit employed in the third preferred embodiment includes a left end surface 721" of the left sleeve section 72" of the tubular sleeve 70", which abuts against the right end surface of the inner race 612" of the left bearing unit 61" and which constitutes the abutment surface. The right sleeve section 73" of the tubular sleeve 70" has a right end, which is formed with a radially and outwardly extending flange 75" that is fixed thereon for abutment against a right end surface of the inner race 622" of the right bearing unit 62". A C-shaped retaining ring 74" is provided in the large-diameter wall section 512" of the outer shell 51". The retaining ring 74" engages an annular groove 53" in the outer shell 51", and abuts against a left end surface of the outer race 621" of the right bearing unit 62".

With this invention thus explained, it is apparent that numerous modifications and variations can be made without departing from the scope and spirit of this invention. It is therefore intended that the invention be limited only as indicated in the appended claims.

I claim:

1. A free-wheel hub transmission mechanism comprising:

an axle having left and right axle portions;

a tubular spoke-mounting barrel having a right end portion and defining an axially extending through-hole therethrough, said axle extending co-axially through said through-hole with said right axle portion projecting outwardly from said right end portion of said spoke-mounting barrel;

a sprocket mounting member sleeved around said right axle portion of said axle adjacent to said right end portion of said spoke-mounting barrel, said sprocket mounting member including an outer shell coupled with said right end portion of said spoke-mounting barrel, and having an inner wall that is formed with a proximate small-diameter wall section relative to said right end portion of said spoke-mounting barrel and a distal large-diameter wall section, thereby defining a shoulder between said small and large-diameter wall sections, a left bearing unit disposed inside said large-diameter wall section, and having an inner race sleeved around said right axle portion of said axle, and an outer race which has a left end surface that abuts against said shoulder of said outer shell, and an outer circumferential surface that is in tight engagement with said outer shell, said inner race of said left bearing unit having left and right end surfaces, a tubular sleeve disposed inside said large-diameter wall section and around said right axle portion of said axle, said tubular sleeve having a left sleeve section with an abutment surface abutting against said right end surface of said inner race of said left bearing unit, and a right sleeve section extending axially from said left sleeve section away from said left bearing unit, a right bearing unit disposed inside said large-diameter wall section and spaced apart axially from said left bearing unit, said right bearing unit having an outer race in tight engagement with said outer shell and an inner race that is disposed around said right sleeve section of said tubular sleeve and that has left and right end surfaces, and a restricting spacer unit disposed inside said large-diameter wall section to restrict axial displacement of said left and right bearing units relative to each other, thereby immobilizing said inner races of said left and right bearing units relative to said tubular sleeve; and a clutch assembly disposed inside said right end portion of said spoke-mounting barrel and operably coupled with said outer shell so as to permit co-rotation of said spoke-mounting barrel with said sprocket mounting member in only a single direction.

2. The free-wheel hub transmission mechanism as defined in claim 1, wherein said restricting spacer unit includes:

a left end surface of said left sleeve section of said tubular sleeve, which abuts against said right end surface of said inner race of said left bearing unit and which constitutes said abutment surface; and an annular flange projecting integrally, radially and outwardly from said left sleeve section of said tubular sleeve, and having a right end surface for abutment against said left end surface of said inner race of said right bearing unit.

3. The free-wheel hub transmission mechanism as defined in claim 1, wherein said left sleeve section of said tubular sleeve has a small-diameter left portion and a large-diameter right portion, which has a diameter larger than that of said small-diameter left portion so as to define a left shoulder therebetween that abuts against said right end surface of said inner race of said left bearing unit and that constitutes said abutment surface, said right sleeve section of said tubular sleeve having a diameter smaller than that of said large-diameter right portion, thereby defining a right shoulder therebetween that abuts against said left end surface of said inner race of said right bearing unit, said left and right shoulders constituting said restricting spacer unit.

4. The free-wheel hub transmission mechanism as defined in claim 1, wherein said outer race of said right bearing unit has left and right end surfaces, said large-diameter wall section of said outer shell being formed with an annular groove, said restricting spacer unit including:

a left end surface of said left sleeve section of said tubular sleeve, which abuts against said right end surface of said inner race of said left bearing unit and which constitutes said abutment surface;

said right sleeve section of said tubular sleeve having a right end, which is formed with a radially and outwardly extending flange that is fixed thereon for abutment against said right end surface of said inner race of said right bearing unit; and a C-shaped retaining ring engaging said annular groove in said outer shell and abutting against said left end surface of said outer race of said right bearing unit.

* * * * *